United States Patent [19]
Sanderford et al.

[11] Patent Number: 6,084,547
[45] Date of Patent: Jul. 4, 2000

[54] ENHANCED POSITION CALCULATION

[75] Inventors: H. Britton Sanderford, New Orleans, La.; Martin C. Poppe, Burlington, Vt.

[73] Assignee: Sanconix Inc., New Orleans, La.

[21] Appl. No.: 09/276,729

[22] Filed: Mar. 26, 1999

Related U.S. Application Data

[62] Division of application No. 08/941,367, Sep. 30, 1997, Pat. No. 5,917,449, which is a division of application No. 08/487,522, Jun. 7, 1995, Pat. No. 5,717,406.

[51] Int. Cl.$^7$ .................................................. G01S 3/02
[52] U.S. Cl. ........................................... 342/457; 342/463
[58] Field of Search ..................................... 342/457, 463

[56] References Cited

U.S. PATENT DOCUMENTS 5,724,243  3/1998  Westerlage et al. .................... 342/457

FOREIGN PATENT DOCUMENTS

0631453 A2  12/1994  European Pat. Off. .
470 151      11/1993  Sweden .

*Primary Examiner*—Theodore M. Blum
*Attorney, Agent, or Firm*—Oblon, Spivak, McClelland, Maier & Neustadt, P.C.

[57] ABSTRACT

The invention discloses several computation and control techniques which use historic information as well as other cues in order to enhance the accuracy of a radio position fix. These computational techniques include neural networks, mapped grid coefficients as input to a set of simultaneous or differential equations, and table lookup of correction coefficients for known low accuracy positions. The invention further discloses techniques for receiver array synchronization so that all system elements in a particular coverage area obtain a time reference appropriate for time of flight radio location measurements. The invention further teaches techniques to enhance the accuracy of a position fix by use of both fixed references, which are located in a coverage area, as well as a mobile reference carried by a search team. The invention also discloses techniques to provide information appropriate to guide a search team to an unknown positioned transmitter that is located within a building or structure. The invention discloses techniques to train a central computing unit, by using actuarial data, so that multi-path errors resulting from fixed or mobile obstacles may be reduced.

10 Claims, 11 Drawing Sheets

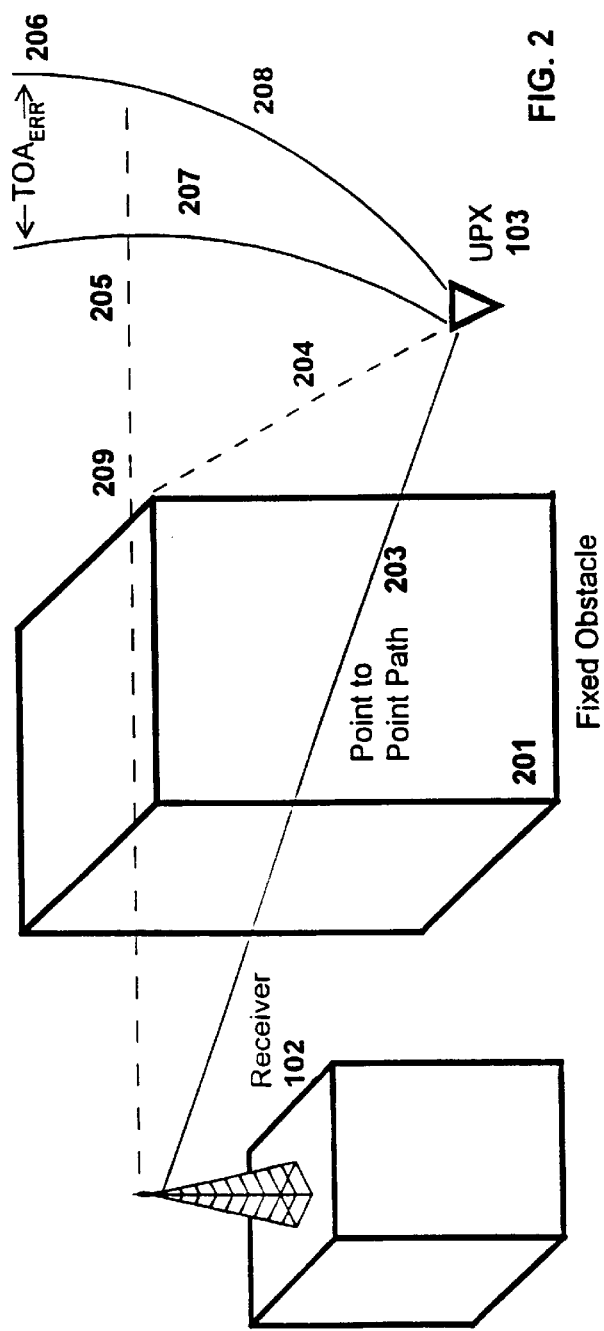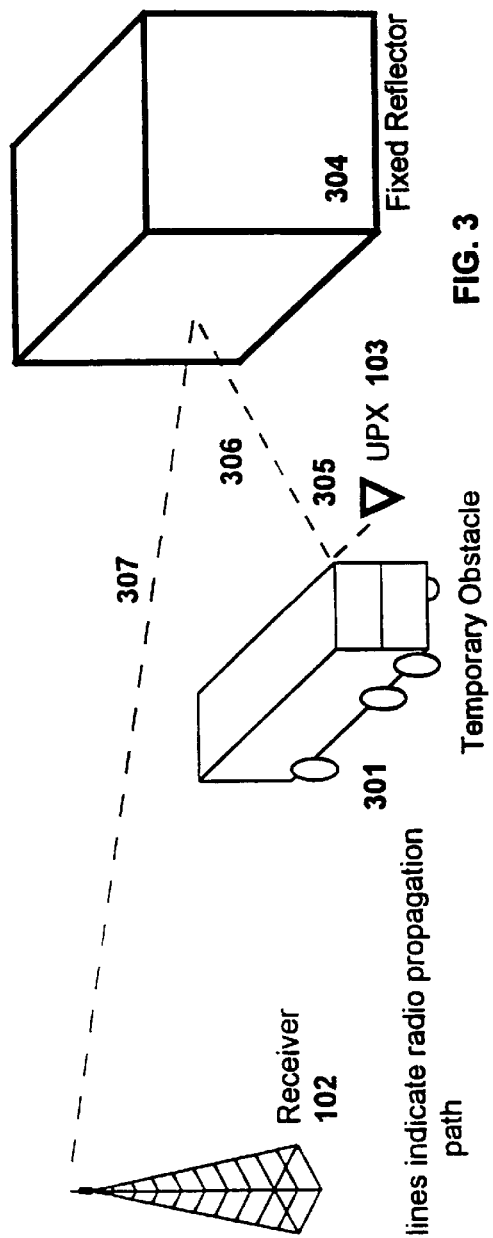

Count = RTOA + Drift (Time between Ref & UPX)

Grid Synchronization
from Fixed Reference Xmitter $RTOA_{RCV1} - RTOA_{RCV2} = TD$ (HYPERBOLIC LINE-OF-POSITION)

TOA = SPHERICAL LINE-OF-POSITION

ENHANCED POSITION CALCULATION

CROSS-REFERENCE TO RELATED APPLICATIONS

This application is a division of Ser. No. 08/941,367 filed Sep. 30, 1997 (now U.S. Pat. No. 5,917,449) which is a division of Ser. No. 08/487,522 filed Jun. 7, 1995 (now U.S. Pat. No. 5,717,406).

FIELD OF INVENTION

This invention relates to life safety systems where a radio transmitter broadcasts from an unknown location; the unknown location can be estimated using a set of receivers and a signal processing network designed using a neural network or an associative memory.

BACKGROUND OF THE INVENTION

DISCUSSION OF THE BACKGROUND

The need exists for a highly reliable and accurate system which can locate a radio transmitter in an unknown position in a citywide or local area of coverage. Applications include personal safety from assault or medical causes, roadside assistance, child monitoring for kidnapping recovery, monitoring of the elderly to reduce walk aways, drug enforcement, early release or parolee monitoring, as well as stolen vehicle or stolen equipment recovery. The unknown position radio transmitter broadcasts a signal that reflects off of objects, such as buildings or buses, before arriving at a series of receivers. These reflections cause several versions of the same signal, delayed by different amounts depending on the number of reflections incurred, to be superimposed with one another. This distorts the transmitted signal and, if uncorrected, prevents reception and processing of the signal.

Present systems include inherent drawbacks, such as continual monitoring, which require full time surveillance operation or GPS services which require physically larger units with short battery lives and which must operate outdoors in reasonably good view of several satellites. Stanford Telecom, in "RF Design", October 1992, teaches the use of signal averaging to reduce multi-path errors. "The tracking error is not always the same sign since the multi-path will either subtract or add to the signal depending on its carrier phase with respect to that of the direct signal. In the moving vehicles, multi-path tends to change sign rather rapidly and is noiselike, averaging out in the long term."

In *Spread Spectrum Systems, Third Edition*, Dixon teaches the use of spread spectrum in time of flight to yield position fix information. Sanderford, et al., in U.S. Pat. No. 4,799,062 disclose the use of additional receiving sites so that signals from one or more receiving sites that suffer from delays, due to multi-path errors, can be removed as inputs to a least squares fit algorithm. Sanderford further teaches the use of a mobile reference transmitter carried by a search team which is guided by a central dispatch station. The guidance is provided through a differential term derived from a poll reply of the unknown positioned transmitter. However, this technique requires that the unknown positioned transmitter have two-way communication capabilities.

Global positioning systems also provide radio location capability if connected in a manner to re-transmit latitude, longitude, altitude information to a remote central monitoring station. GPS has several shortcomings as compared to the instant invention for the applications contemplated herein. These include direct signal propagation through the interior of multi-story buildings, the increased size and weight due to the requirement of the inclusion of a receiver as well as a transmitter, and reduced battery life due to the current drain of the element of the GPS receiver. The applications require physically small devices, long battery life, and imply transmit-only operation. Successful operation is mandatory, even in a heavily radio frequency shielded environment such as a multi-story high-rise building. In order to increase the Signal-to-Noise Ratio available to a system receiver from a system transmitter whose operation is constrained to the preceding conditions, it is desirable to locate the receiver on a ground-based platform as opposed to an orbital one. The ground-based receiver platform does have a disadvantage due to a fairly complex radio wave travel path from the system transmitter (multi-path signal distortion). Urban and suburban multi-path distortion may be quite severe, as it's cause increases dramatically with each new object inserted into the path from system transmitter to system receiver (i.e. buildings, vehicles, structures). These objects cause destructive "copies" (echoes) of the radio signal to be generated each time the signal "reflects" (bounces) off of one. The echoes arrive at the system receiver later in time than the desired (direct path) signal, causing loss of signal, or producing erroneous measurements. The analysis of how a particular environment will induce multi-path distortion is called a "Delay Spread Profile". Delay spread profile analysis shows multi-path echoes on the order of one to five microseconds are not uncommon in urban and suburban environments. Delay spreads of this magnitude cause one thousand feet to one mile potential error to a transmitter's calculated position if error removal tactics are not employed.

SUMMARY OF THE INVENTION

A first object of the invention is to overcome the problems of the prior art discussed above.

The second object is to achieve a position fix accuracy and reliability appropriate for life safety applications.

A third object of the invention is to locate a low Signal-to-Noise Ratio transmission with increased accuracy.

A further object of the invention is to be able to locate a transmitter which is located inside of a multi-story building. This process may be further aided by the employment of a search team equipped with a mobile reference unit.

A further object of the invention is to remove position fix errors which result from fixed obstacles.

Another object of the invention is to remove errors from mobile obstacles. This requires either additional receivers or the ability to employ time diversity.

A further object of the invention is to correct drift errors which result from imperfect time references contained within the various system elements as well as to provide a point or points of common synchronization for the computation of Relative Time-of-Arrival readings.

A further object of the invention is to learn the signature of an area or areas frequented by a user to increase the accuracy of a position fix made at a future time in that same location.

A further object of the invention is to provide intelligent averaging or weighting of previous position fixes in order to further enhance the accuracy of the most recent position fix.

Another object of the invention is to provide cues appropriate to guide a search team equipped with a mobile reference unit to find a transmitter of unknown position.

All radio location systems must provide at least two major functions: (1) to accurately determine a first arriving radio signal or to determine some appropriate attribute of a radio signal which can be used to determine a transmitter's position, (2) computational techniques which are appropriate to convert the information gained into useful position fix information which typically includes latitude, longitude and altitude. The invention and the embodiments disclosed herein are concerned with this second area of functionality required in a radio location system.

The disclosed invention uses historic information, training sessions, special system reference cues, as well as ongoing learning in order to enhance a radio location system's position calculation accuracy. The invention further seeks to reduce overall system drift errors caused by the imperfection of the time bases used in the various system elements.

Tests were performed in both urban and suburban areas with a direct sequence spread spectrum, time of flight measuring system. The said system was a transponding return time of flight measurement measuring device. It used approximately 1.2 megachip per second, 127 chips and a sliding correlator to acquire the signal. In downtown areas large distance measurement jumps of 600 to 1200 feet were logged. These jumps were repeatable if the receiving unit was brought into the same range of proximity of the previously noted jump. When observing the immediate surroundings of areas in which these jumps occurred, it was consistently noted that large buildings or structures obscured the direct path of the signal. The sliding correlator was still able to acquire a first arriving signal, however, said signal was delayed by the added propagation path forced by the large building or structure. Therefore, even a perfectly accurate time of flight receiving device would yield errors due to the geometry of the environment in which the system was operated. In order to increase the accuracy and reliability of the positioning information therefore requires additional tactics which use both past history and other system cues in order to overcome both fixed and moving radio obstacles.

The prior art does not teach overcoming these problems using the techniques of the present invention. Stanford Telecom does not teach the use of historic information to create a data base or weightings in order to correct future readings. Dixon does not teach the use of training, or historical data base information, or pointing functions derived from past information or other system cues in order to enhance the calculation of the position fix. Sanderford does not disclose the use of historic information in order to enhance the accuracy of the position calculation. Furthermore, although GPS systems can provide some position information, GPS systems do not use historic information or of error weightings in order to enhance the accuracy of the position fix calculation.

The instant invention uses one-way communication and can further input the mobile reference Time-of-Arrival/Relative-Time-of Arrival unit into a neural network, thereby enhancing information available to compute a position fix.

The instant invention is intended to increase the accuracy of a radio location system through computational means which is located at some central receiving site. The inputs to these enhanced calculation devices/methods can be any one of a number of position determination measuring techniques. For example, Time-of-Arrival information or Relative Time-of-Arrival information can be derived from chirp spread spectrum, pulsed radio, a combination of wave shaped pulse with phase information, phase information from a sin wave with no wave shaping, or by the correlation either serial or parallel of a direct sequence spread spectrum transmission. In addition to the Time-of-Arrival techniques, multiple antennas can be used to establish the X, Y, Z phase of a received H field or E field signal. Electrically rotated phase antennas such as VOR may also be employed. The invention and techniques described herein may also be employed to enhance the position location accuracy of cellular type radio systems by the use of the amplitude, phase, and antenna quadrant information available. Further, any combination of the above techniques may be used to further enrich the information available to the computational elements disclosed herein.

All of the techniques disclosed herein can benefit from an initial training session, although the training session may actually be accomplished during the system's normal operation. One such training session consists of driving a vehicle around a city or suburban area or area of coverage interest. Such vehicle would be equipped with a reference transmitter. In addition, the vehicle would be equipped with a technique, or techniques, capable of independently establishing the accurate location of the vehicle. In this manner, the so equipped vehicle would communicate both independent position information as well as beacon transmissions capable of being measured by the radio location system's distributed receivers. This training information could be used to create table or matrix lookup correction factors or to establish the appropriate weighting coefficients in a neural network. This information could be collected and used in real time or appropriately post processed by any one of the neural network training techniques as known in the art. Such neural network training techniques include, but are not limited to, back propagation, recurrent back propagation, probabilistic neural network, learning vector quantization and k-means clustering.

In addition to the either initial or ongoing training, other specific training may be employed. A user of the radio location service who carries a UPX on their person may either initially or periodically call in to a central station operator or to a voice command type system. At that time, the user may verbally or numerically indicate his or her physical location at that time. The user would then initiate a sequence of transmissions on their UPX. The user may stand in one position or may walk in a slow circle in order to enrich the variety of resulting position fixes received by the central monitoring processor. An alternative to calling in to a system, the UPX may be equipped with a small radio receiver or a local H-field receiver. Upon the UPX receiving a properly coded message, the UPX may automatically invoke a training burst of transmissions. The initiating devices may be located in the user's office or if the UPX used is affixed to an inanimate object, the initiating device may be located in a known or suspected path of the UPX travel. The initiating device may be encoded with information relating to latitude, longitude and altitude so that the central procession can associate this "known" information with the position fixes directly resulting from the initiating device's forced training burst sequence. Either of these techniques may be used to establish an electronic "fingerprint" of likely UPX locations which require a high degree of accuracy in subsequent position fix calculations.

In addition to potential initial training sessions, fixed references may be installed in part or all of a coverage area. These fixed references would either transmit their known latitude, longitude, altitude position or transmit their ID which would later be associated with known latitude, longitude, altitude information in some central data base.

Further, these fixed references may be made a portion of the receiving unit's which are distributed across a city or coverage area. These fixed references may be at similar altitudes but would benefit from being held at various altitudes in order to enhance Z-axis position determination.

Since these fixed references are at known, stationary locations, their resulting Time-of-Arrival/Relative Time-of-Arrival information may be used to calibrate the system or to provide further training to a neural network. Further, these fixed references may be used to remove or compensate drift caused by imperfect time references used by the various system elements. In either a Relative Time-of-Arrival or Time-of-Arrival radio location system, an accurate time base is used as a reference to provide time of flight information. Any drift or inaccuracy in these time references will cause system errors.

The present invention provides additional accuracy by providing an estimate of a position from which a transmitter is transmitting even when not all of the receivers receiver the transmitted signal. Furthermore, not all receivers have to receive all training signals either.

Some position/location errors in the location system can be on a periodic or seasonal basis or the result of local weather systems. Time-of-day as well as time or season may be further input to the neural network/processor. The position computing means may then use previous daily or yearly historic information to enhance the accuracy of the position.

A search team may also be employed to locate a UPX for life safety applications. The search team can force a transmission from their MRX within certain known locations, they also can receive those UPX transmissions from the MRX unit which they carry. That information may be combined with the search team's absolute reference position. Such absolute position may be entered by the search team and transmitted by the MRX or via any method that would accurately determine and communicate the mobile reference team's position. This technique may be particularly useful in a multi-story building whereby the search team would initiate a reference transmission once they enter the first floor of the target building.

If any of the computing elements, as disclosed herein, predict that the UPX is in motion, then signal averaging may be invoked in order to reduce Gaussian type error terms in the Time-of-Arrival/Relative Time-of-Arrival readings. Further, a simple calculation can be provided to monitor and predict the direction and velocity of the UPX. If a neural network is used to provide the position fix calculation, then the last M position fixes of a particular UPX may further be used as input to the neural network's matrix. In this manner, the neural network may take advantage of the past M readings in order to enhance the position fix accuracy of the most recent received transmission.

The position fix processor will input either Relative Time-of-Arrival or Time-of-Arrival or time difference information from each of the receivers obtaining a message from a particular UPX. In addition, the receivers may also provide signal-to-noise ratio information and antenna quadrant information. Receivers may be outfitted with four or eight directional antennas. If four or eight independent receivers are utilized, then any one or several of the four or eight receivers may provide valuable radio location information to the position fix processor.

The use of an error correction table, a matrix lookup technique, or the use of neural network processing techniques will increase the accuracy of the position fixes generated. This means that signals received or signal-to-noise ratio may still be adequate to provide the services as contemplated herein. The ability to work with low signal-to-noise ratio signals will facilitate the use of more distant receiver sites and enriched information gathered from receiver sites more distant than a first ring constellation of receivers. Using low signal-to-noise ratios also provides the ability to locate a transmitter deep within a multi-story building. A typical home may represent approximately 10 dB of signal attenuation at 900 MHz. A multi-story building can easily cause 30 dB of signal attenuation. This attenuation must be either overcome by transmitted power, closer receiver sites, reduced information bandwidth, longer transmissions, making the position fix processor tolerant of poor and noisy signals, or any combination of these techniques.

Multi-path/obstacle removal may be accomplished by the processor methods disclosed herein and fall into two categories: 1) fixed obstacle and 2) mobile obstacles. A fixed obstacle is a large building or structure that will cause a multi-path reflection which is repeatable over some long period of time. The initial training sessions isolate these anomalous added paths and adapt them to the neural network or error correction matrix or table. Once the anomalies are learned, the added path and error term actually becomes useful information to enhance the accuracy of the position fix calculation.

Mobile obstacles are compensated for by direct tactics. One of three tactics may be employed to reduce the errors from such obstacles. Additional receivers may be used such that a receiver suspected of a multi-path error may be eliminated from a position fix calculation such as a least squares fit. In the alternative, when using a neural network for the position fix calculation, the network may automatically discount or proportionally reduce the weighting of the input from a suspect receiver. If a mobile obstacle moves in a relatively short period of time, then time diversity may be employed. In this case, if a particular reading is suspect of error due to a mobile obstacle, a method seeks to obtain further position fix readings which may be unaffected by the mobile obstacle. As a :final alternative, multi-path errors, short or long, can only increase the apparent time of flight/TOA/RTOA readings since the multi-path error is caused from a reflection which causes the traveled path to be longer than the geometric point-to-point path. Methods are disclosed herein which intelligently reduce the Time-of-Arrival/Relative Time-of-Arrival until the triangulation or least squares fit model yields the lowest error term or an error term of an acceptable level.

The position processor means may be implemented using a neural network, a correction factor matrix, or a correction factor lookup table. Neural networks provide inherent interpolation between previously learned data points so that even if unexpected or error prone inputs are encountered, the neural network will automatically provide the best fit to its past training experience. When using the matrix lookup or table lookup techniques, additional methods must be provided to correct multi-path errors if a UPX is located in between two or more matrix points, or in between the two most likely table lookup points. In these cases, additional interpolation can be used to enhance position calculation accuracy. Interpolation algorithms include linear interpolation, linear approximation, linear regression, simultaneous equations, a system of differential equations, or the like.

The neural network will directly yield outputs including latitude, longitude and altitude. The matrix lookup or table lookup must input to other position calculation algorithms as are known in the art. These include triangulation, multi-lateration, least squares fit algorithms and the like.

If only one or two of a constellation of phase repeaters are able to successfully receive a weak signal, the remainder of the nearby phase repeaters can be made more sensitive through a windowing function, provided that the UPX transmits on a sleep interval pattern which is known to the necessary system elements. In addition to this, the chip position would also be known within one or several chips which could be used to lower the amount of search time required by other receivers, and hence subsequently increase the available dwell time and therefore increase signal-to-noise ratio. Further, since the frequency of the UPX would be accurately known, the other receivers would not have to perform frequency searches and/or may further reduce their I.F. bandwidth.

If the ID of a UPX can be decoded by one receiver, it may be assumed that signals simultaneously reaching other receivers, within a certain proximity, are also from this same transmitter. This can cue the control processor to utilize TOA/RTOA information which may be of poor quality but useable. The processor techniques disclosed herein are compatible with poor quality TOA/RTOA information. It is possible for a receiver, which is properly windowed by means as known in the art, to yield RTOA/TOA information with a SNR too poor to yield data. This is due to the fact that a bit time is only a small portion of a message time and every (or nearly every) bit must be correct in order to properly decode a UPX's ID. If no error correction/message redundancy is used, then:

$$P_{f(message)} = P_{f(bit)} * N_{bits}$$

whereas TOA/RTOA information may be collected over an entire message time. This provides an SNR advantage of approximately:

$$10 \, Log \, \frac{message \, duration}{bit \, duration}$$

for a 60 bit message, this would provide an 18 dB advantage, which may be the margin necessary to get a position fix within a building.

Typically, the first arriving signal in a time of flight radio location system yields the most accurate position fix. This first arriving signal leads a complex pattern of signal peaks and valleys called a delay spread profile. A typical delay spread profile has multiple peaks within its envelope. These peaks are caused by the reflectors which are in the vicinity of the Unknown Position Transmitter. In communication systems, these peaks are desirable because they contain additional energy for a receiver to improve signal-to-noise ratio and more readily decode data. Since these additional peaks are caused by reflectors in the vicinity of the UPX, they may also be considered as a "signature" or "fingerprint". This additional information may be able to provide cues to an appropriate central processing device. Neural networks are especially well suited for such imperfect and complex information. A RAKE receiver designed for time of flight usage would supply information from multiple peaks, and perhaps valleys as well, to the central processing unit. This information would associate the amplitude of a peak or valley with its associated time delay from the initially arriving signal. This signature information is particularly useful when previous training sessions have provided historic information in order to compare a present reading against.

The system of receivers distributed through a particular coverage area must develop time references from which to compare the position of the arrival of a transmission from a UPX. Several techniques to accomplish this antenna grid calibration/synchronization are described herein. For example, a GPS receiver can be outfitted with a real time reference. This reference is tightly coupled to the accuracy of the cesium atomic clocks used by the GPS satellite system. The output of such a receiver can produce one second time ticks such that every system receiver outfitted with a GPS receiver would simultaneously receive a "beginning of one second interval" time marker as well as a high frequency accurate clock output period. Any further time offsets from GPS receiver to GPS receiver may be caused by the varying distances between that receiver and other associated receivers. These can be corrected through either an initial fixed offset or by differential GPS techniques which are well known in the art. As an alternative to a GPS reference, one or more master references may be installed which can provide evenly distributed time markers which can then in turn calibrate the internal time base of the receivers located in a coverage area. The synchronizing transmitter may be one single transmitter located at an elevation appropriate to be received by all receivers of the coverage area. Alternatively, multiple synchronizing transmitters may be placed at lower elevations and distributed throughout a coverage area such that all receivers are within radio view of a synchronizing transmitter.

Alternatively, the fixed position reference transmitters, FRX's, may be distributed throughout a coverage area such that every receiver is capable of receiving a reference message from one or more of the FRX's. These FRX's do not recalibrate the internal time base of the receiver, rather they provide a relative time stamp from which to measure subsequent UPX transmissions. In addition, techniques are described herein which allow for the second order and third order compensation of a receiver's internal time reference via algebraic and neural network means.

This compensation means may be implemented as a pre-processor or pre-neural network to the position determining neural network. The pre-neural network may employ a constant retraining method using the fixed references as known. This would reduce the complexity of the subsequent position determining neural network processor. Further, some or all of the receivers in a coverage area may be equipped with an associated transmitter. This transmitter transmits at a fixed interval based on the receiver's internal time base. This information may be further used to compensate for the drift of the receiver's internal time base. Additionally, during these specially transmitted messages, the receiver's internal reference counter may be transmitted as part of these periodic messages. This provides additional information to compensate out drift errors due to the receiver's internal time base. This compensation can be accomplished either algebraically or via neural network means as described herein. An additional benefit of such techniques is that changes in overall system propagation path and propagation speed variations will be automatically compensated for as the system compensates for the drift resulting from receiver time base imperfections. Neural networks may further be able to compensate the drift on a third order or greater basis and may even take into consideration variations associated with time of day or time of season on a receiver's time base and the system as a whole. This would have the effect of allowing the use of lower cost time references and possibly even uncompensated crystals. To this end a receiver may measure its operating temperature and send that information to the central processing device in order to enhance such temperature drift corrections.

The fixed reference transmitters can be used by the central processing unit to correct drift on a higher level basis. Since the central processing unit will know that the fixed reference transmitters do not move, it may also adaptively correct all of the readings from fixed reference transmitters such that the latitude, longitude, altitude position fixes remain constant at their known points of origin. In order for the central processing unit to effect such constant positions of the fixed reference transmitters, even in the face of receiver time base drift, correction factors must be provided either methodically or by altering the weights on a neural network's synopsis. The neural network system will automatically make these system-wide corrections. The same corrections may be applied to the reception from UPX devices. These system-wide corrections will automatically correct for errors which might have been caused by either seasonal, propagation path, propagation speed, or time base drift and yield more accurate position fixes for UPX devices.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a schematic illustration showing the shortest path and a reflection of a transmitted radio signal from a UPX off of a fixed object;

FIG. 3 is a schematic illustration showing a reflection of a transmitted radio signal from a UPX off of a temporary obstacle;

DETAILED DESCRIPTION OF THE PREFERRED EMBODIMENTS

Figure 1:
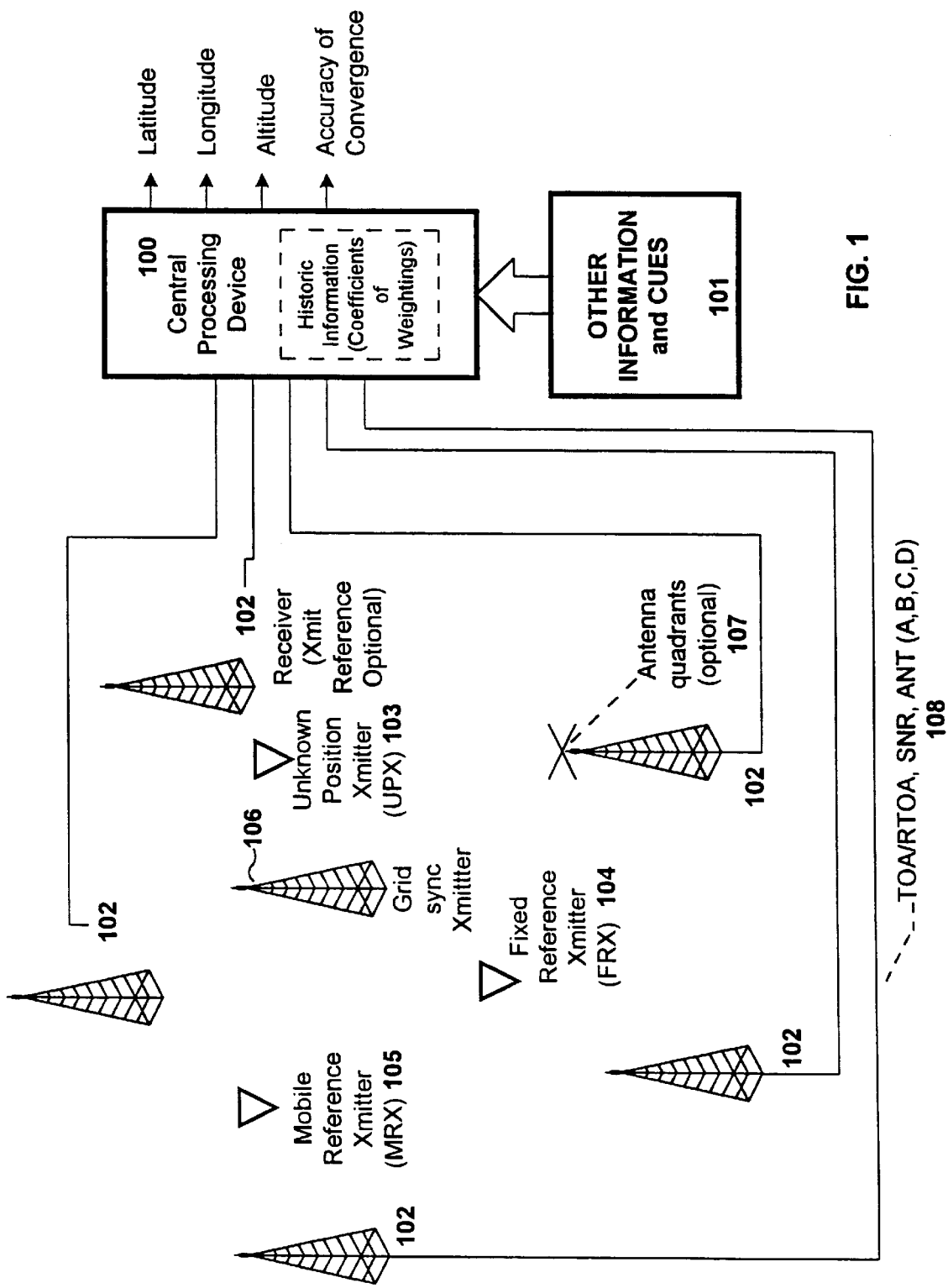
FIG. 1 is a system diagram of the entire system showing the receivers, with optional directional antennas and transmitters, receiving radio signals into a central processing device (CPD) from an unknown position transmitter (UPX) and, optionally, from a mobile reference transmitter, a fixed reference transmitter and a grid synchronizing transmitter.

FIG. 1 shows a system overview of the present invention. The central processing device 100 collects information from several receiving sites 102. The central processing device 100 uses historic information and other cues in order to enhance the accuracy of a position fix calculation. The output of the central processing device 100 is essentially X, Y and Z, and more particularly latitude, longitude, altitude and, optionally, accuracy of position fix conversions, velocity of a UPX or heading of a UPX. The central processing device may derive improvements from a table or matrix of correction coefficients. The central processing device may also be a neural network device whereby previous history is represented as weighting on the neural network's synapses. The central processing device also benefits from other information and cues 101 such as time of day, time of season, humidity, known location of receivers 102, GPS data, temperature, previous determination of velocity in vector and direction vectors.

The receivers 102 are synchronized by a grid synchronization transmitter 106, GPS satellites, or the like. The purpose of the overall grid synchronization is to provide a consistent and accurate reference by which to compare arriving signals from other system elements.

The purpose of the radio location system as taught herein is to accurately determine the location of an Unknown Position Transmitter, UPX, 103. The UPX may be a transmit-only device, in which case transmissions are either periodic, based on some internal time reference and/or transmissions, or via initiation by some outside stimulus, including a request for help. The UPX may also be a two-way communication device whereby a transmission is initiated also upon the reception of a polling signal. Lastly, the UPX may be implemented as a transponder whereby round trip Time-of-Arrival measurements may be provided. The Unknown Position Transmitter would typically include in its transmitted message an identification code as well as other data. This data may include the city of origin code, status information such as battery low, device OK, a modulo transmission number counter, or a supplier code in order to logically isolate systems which may be provided by two independent suppliers/manufacturers. The data may further comtain an indication of the time of the next transmission. This message would typically be forwarded by a third detection/error correction code to enhance the reliability of the received message. In addition to this information, the status of reference fields would be supplied to indicate medical emergency, roadway assistance, police emergency, kidnapping, tamper, etc.

Upon the receipt by the central processing device of an initial message from a UPX 103, the dispatch operator at the central station may further guide a search team equipped with a mobile reference transmitter, MRX 105, in close proximity of the UPX 103. Once the mobile reference device becomes near the unknown positioned transmitter, the error terms created by multi-path reflections, as well as other environmental factors, will become very similar. The central processing device may thereby accurately compute the differential vector which represents the path and direction which a search team must travel in order to intersect the UPX 103. The MRX may also be provided with a transponder mode to repeat the UPX transmission. This repeated transmission has an added path delay compared to the MRX. This added delay forms a radius about the MRX. The resulting sphere may be used by the central monitoring station to augment the position calculation of the UPX.

The system may further benefit by one or more fixed reference transmitters, FRX's, 104. The purpose of the fixed reference transmitters is to provide transmissions from known fixed positions within a particular coverage area. These fixed reference transmitters are used by the central processing device 100 in order to calibrate system errors due to varying environmental conditions as well as drift caused by imperfect time bases within the various receivers.

A receiver 102 may provide to the central processing device 100 information which includes Time-of-Arrival, TOA/Relative Time-of-Arrival, RTOA, signal-to-noise ratio, SNR and antenna quadrants (A,B,C,D) 108. The receivers 102 may optionally be equipped with multiple antennas separated into four or eight quadrants 107. If each antenna is provided with its own independent receiver, each receiver may provide different and useful Time-of-Arrival information. Alternatively, an antenna may be selected which yields the strongest signal. As a further alternative the antenna may be selected which provides the earliest arriving signal. Cellular telephone systems, for example, provide both signal-to-noise ratio information as well as antenna quadrant information. With the enhanced position calculation methods taught herein, this information may be adequate to provide accurate position fixes of cellular telephone devices in a particular coverage area.

In order to support the windowing function of a receiver, the transmitter may, as a part of its data message, include bits which indicate the time duration until the next transmission by that UPX. As an alternative, the UPX may transmit on a regular or on a known transmission interval pattern. Even if a pseudo-random pattern was used by the transmitter, a receiver knowing that pattern would be able to take two or more readings from the UPX, and from the time separation, predict the next occurrence of a UPX transmission.

Typically in a radio location system using a grid of fixed receiving 102 towers, each tower must be surveyed for precise latitude, longitude, altitude positions. This information is used in a triangulation, multilateration, least squares fit algorithm. As an alternative to this time consuming and costly process of receiver site survey, the fixed reference transmitters, 104, may function to serve this purpose. The fixed reference transmitters would themselves have to be accurately site surveyed for latitude, longitude and altitude, however. Since the absolute position of the fixed reference transmitters 104 would be known, the central processing device 100 would be able to adjust the resulting position fixes to coincide with the true position of the fixed reference transmitters. Providing the fixed reference transmitters 104 are adequately distributed through a large area of interest, the system would be able to automatically self-calibrate its position fix references. This feature may be useful for quick deployment or temporary deployment systems where the added step of site surveying every receiver may be too time consuming. GPS interface to these devices would remove the need for a survey and allow for rapid deployment to help search teams or provide temporary coverage.

As is shown in FIG. 2, some errors will be consistent due to the overall geometry and position of fixed obstacles in a certain area. When UPX 103 transmits a signal to Receiver 102, its direct point-to-point path 203 is blocked by Fixed Obstacle 201. Instead of the first arriving signal being equal to the distance between the UPX 103 and the Receiver 102, it is instead equal to that true distance plus a relatively repeatable Time-of-Arrival error 206. This Time-of-Arrival error 206 is equal to the effective path increase taken by the signal in order to be received by Receiver 102. This Time-of-Arrival error 206 may be estimated as a guess by swinging two arcs. One arc 207 would begin at the UPX 103 with the radius center at the receiving antenna 102. The other arc 208 would begin at UPX 103 with radius point of origin of 209. This would effectively swing dashed line 204, into the position of dashed line 205. The difference in position of the two arcs, 207 minus 208, would equal the Time-of-Arrival error 206. This fixed error could be learned and stored in a correction factor table, a correction factor matrix or in the weightings of synapses in a neural network.

As is shown in FIG. 3, errors in position fix accuracy may also be caused by temporary obstacles such as moving automobiles, buses, trains, etc. In this example, the direct path of transmission from UPX 103 to receiver 102 is blocked by a bus noted as 301. Instead of the signal from the UPX 103 arriving directly, it's first leg of travel 305 is reflected off of bus 301. The reflection 306 then bounces off of building 304 to finally travel a path 307 to receiver 102. These added reflections again add an error term which is in excess of the direct theoretical point-to-point path traveled.

Several tactics may be employed to eliminate the errors due to temporary obstacles. One such tactic is to deploy a number of receiving towers which is greater than that required to provide the position fixes desired. In this manner a receiver, or receivers, suspect of error due to additional path travel artificially created by a blocking obstacle, may be eliminated from a calculation or may be lowered in weighting by a neural network. As a further alternative, short term diversity may be used such that subsequent transmissions from a UPX may no longer be blocked by a particular temporary obstacle. Lastly, rule based methods may be utilized to intelligently reduce the effective travel path measurement in a manner to increase the position fix accuracy.

Figure 4:
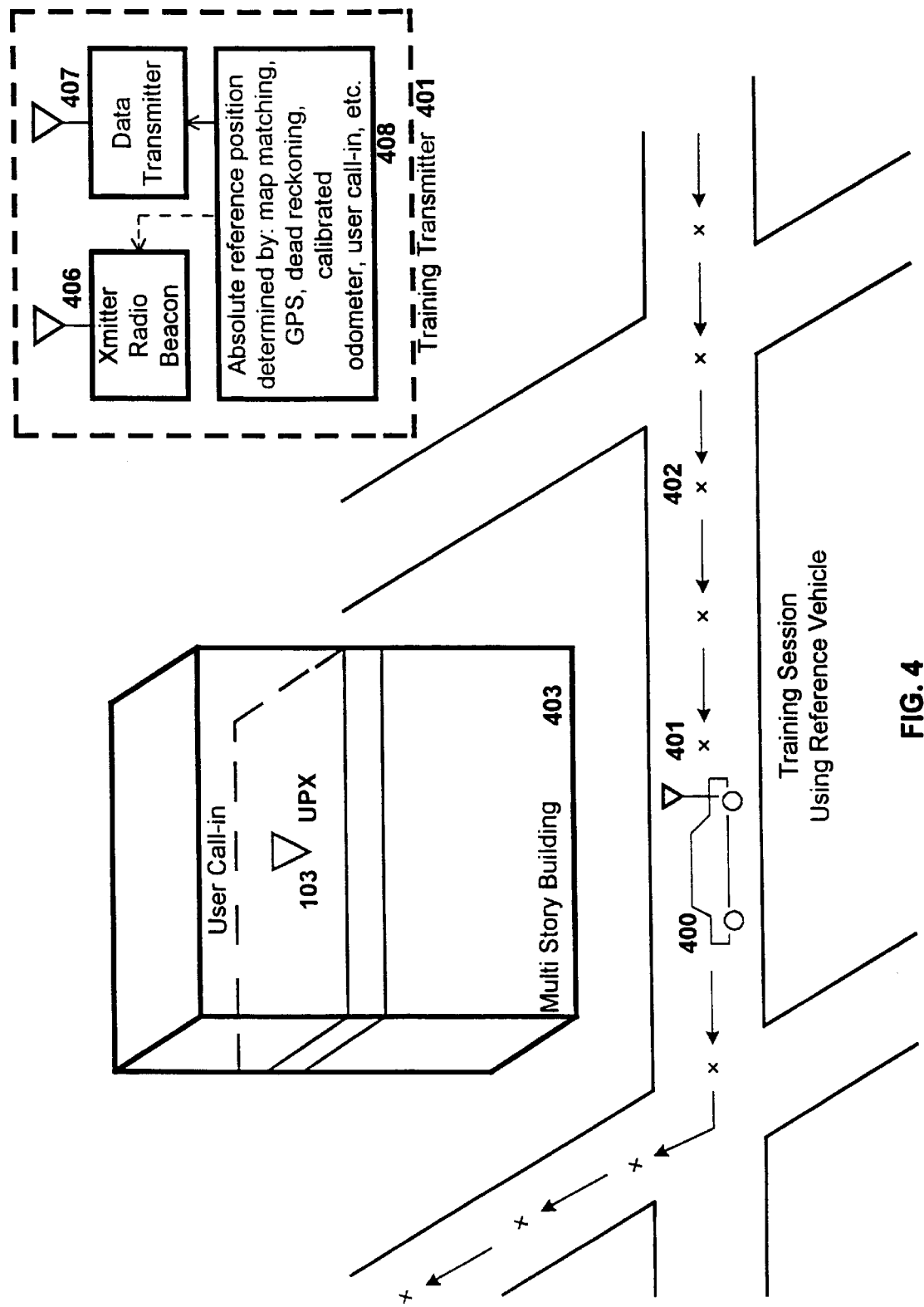
FIG. 4 is a schematic illustration showing a training transmitter and a UPX broadcasting training signals from multiple locations to train the network in the CPD.

Prior to normal operation of the central processor, a training session, depicted in FIG. 4, is utilized to provide actual Time-of-Arrival and Relative Time-of-Arrival information. This training may also proceed over the normal operation of the system's lifetime. The purpose of the training is to associate transmissions from a UPX with independently derived position information which accurately indicates the actual position of the UPX. Typically, a mobile team or a training vehicle 400 would be equipped with a training transmitter 401. The team or the vehicle would then traverse the coverage area of interest. The mobile team or vehicle would particularly concentrate in areas of high multi-path reflectors such as multi-story buildings 403. As the vehicle 400 drives through path where transmissions 402 would regularly be made, reference transmissions are made. In FIG. 4, "XX"s indicate the locations of reference transmissions. Each transmission would also coincide with an indication of actual location of the vehicle.

The training transmitter 401 consists of several blocks. First, it must contain a transmitter radio beacon 406, which is either an Unknown Position Transmitter, UPX 103, or a MRX 105, where the transmitter radio beacon is capable of being located by remote receivers. In addition, the vehicle would house some absolute reference position determining means 408. Such means may include one or more of the following: "map matching", GPS, dead reckoning, calibrated odometer, user call-in, etc. This absolute reference would typically be connected to a data transmitter 407. Alternately, a voice link may be used for an operator to call in absolute reference information. In a further alternative, if the absolute reference position determining means 408 is not fitted with a data transmitter 407, then the radio beacon 406 can transmit absolute reference position information directly.

In addition to the training noted herein, a user may call in their position and simultaneously enable a transmission from a UPX 103. This is particularly useful in situations where increased accuracy is desired. This can often be in places where a user typically frequents, such as the home or an office in a multi-story building 403.

Figure 5:
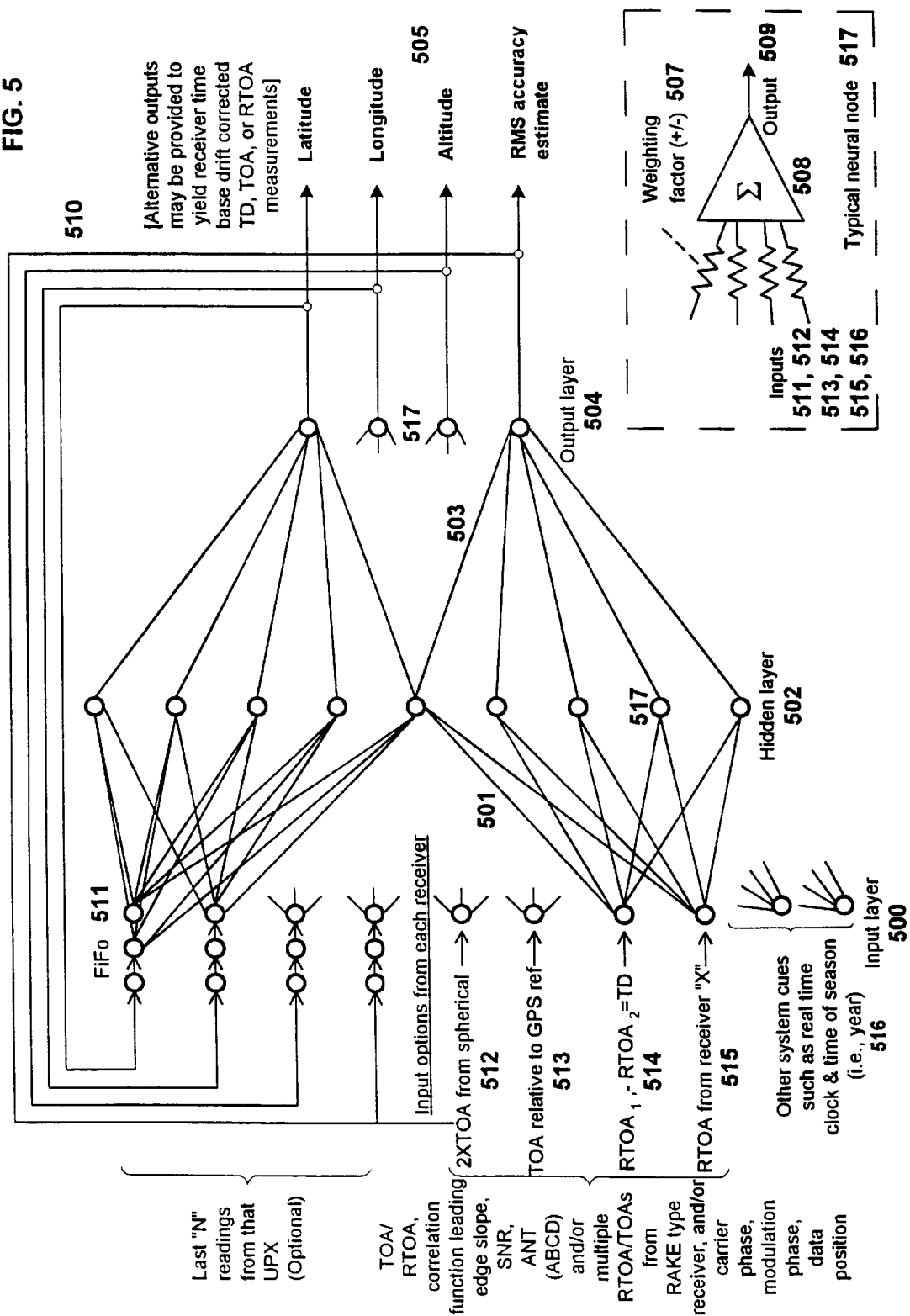
FIG. 5 is a schematic illustration showing a neural network with reference time and position cue inputs and latitude, longitude, altitude and accuracy outputs.

As shown in FIG. 5, several approaches may be taken to accomplish the enhanced position calculations as described herein. The preferred embodiment of the instant invention uses a neural network approach. A typical neural node is shown in inset 517. Each neuron has one or more inputs 506 which are summed into a node 508. The resultant sum is output at 509. Each input is assigned a weighting factor 507. The weighting factor may be positive or negative, and may be accomplished with actual resistors and summed to additive or subtractive nodes of an amplifier. Alternatively, these "resistors" may be coefficients stored in a matrix. The coefficients may have as much resolution as is defined by the number of bits provided. Neural network software is available which can run on conventional Von Newman processors. There is also dedicated parallel processing hardware available which performs calculations in digital form. Lastly, fully analog integrated circuits are being developed which contain hundreds or thousands of individual nodes.

A neural network is able to accomplish its function after one or more training sessions. The training sessions adapt the weighting factor magnitude and sign until the output or outputs yield some desired response. A number of training methods exist and are noted herein. It is anticipated that further training methods will become available. Any method which is able to effectively modify the weighting factors such that future inputs to the network are able to yield accurate outputs, is viable for this application.

The neural network in the preferred embodiment consists of input layer 500, a hidden layer 502 and an output layer 504. The input layer 500 is connected to the hidden layer via multiple associations such as 501. The hidden layer 502 is associated with the output layer through multiple associations such as 503. The output of the neural network provides latitude, longitude, altitude and optionally RMS accuracy estimates, 505.

There are several input options to the input layer 500 of the neural network. These inputs are predominantly from receivers remotely located in the coverage area of interest. Two-way transponding UPX's can provide Time-of-Arrival information from spherical lines of position 512. Alternatively, Time-of-Arrival information relative to a GPS absolute reference located at each receiver 513 may be provided as an input to the neural network. As a further alternative, time differences, TD's, may be computed prior to providing this information to the input layer of the neural network. The TD can be computed as a Relative Time-of-Arrival from receiver N minus Relative Time-of-Arrival from receiver N +M. As a further alternative, Relative Time-of-Arrival information from a receiver "X" 515 may be directly provided to the input layer 500 of the neural network. The information provided from each receiver may include one or more of the following: TOA/RTOA, correlation function leading edge slope, SNR, ANT (A,B,C,D) and/or multiple RTOA/TOAs from rake type receiver, and/or carrier phase, modulation phase, data position.

Other system cues 516 may be provided to the neural network's input layer 500. Such system cues may include a real time clock, possibly in sub-second increments. A time of day/time of year clock, barometric pressure, atmospheric humidity, or any other parametric which may effect the Time-of-Arrival of a radio wave from a UPX 103.

Most applications would be such that the UPX sends multiple transmissions. These multiple transmissions will benefit by temporal diversity. The neural network may take advantage of this additional temporal information by feeding back 510 latitude, longitude, altitude and RMS accuracy estimation information to the neural network's input layer 500. If more than one previous reading is desired for this purpose, a first in, first out, FIFO, 511 may be used to buffer "N" readings from a particular UPX. In this manner, signal averaging may be employed and reduce multi-path errors which are Gaussian or noise like in nature. It is known in the art that transmissions from moving vehicles tend to have multi-path errors which average out. Further, these past "N" readings may be used develop trend information such as velocity and direction vectors.

Some neural network training methods can continue to run during the normal operation of the system. These ongoing algorithms can further modify the weighting factors in order to enhance the accuracy of the position fixes provided. Such algorithms can be further enhanced by deploying transmitters in fixed locations throughout a coverage area, fixed reference transmitters.

As a further alternative to a neural network approach, equivalent functionality can be derived by various associative memory techniques. The associative memory, like the neural net, also require an initial and/or ongoing training process. The associative memory may also be equipped with similar inputs as described herein as well as the same outputs.

The inputs to the neural network may also include multiple peak/valley information from a RAKE type receiver. This information would be in the form of amplitude versus time delay from some reference point. A desirable reference point would be that of the first arriving signal of the delay spread profile. Further, carrier phase, data bit position, or data modulation phase information may also be provided to the inputs of the neural network. This information may be particularly useful for cellular radio telephone type systems where chip code position and direct sequence information is not available. This phase information in combination with the Signal-to-Noise Ratio and antenna quadrant information are all available or can be derived from a cellular receiving node. This information, when enhanced by the neural network, or by the other processor means as described herein, will provide increased accuracy position fixes. For non-cellular telephone type systems, this carrier phase, data bit position, data modulation and phase information may be used in combination with other cues such as time of flight information from a direct sequence system.

Figure 6:
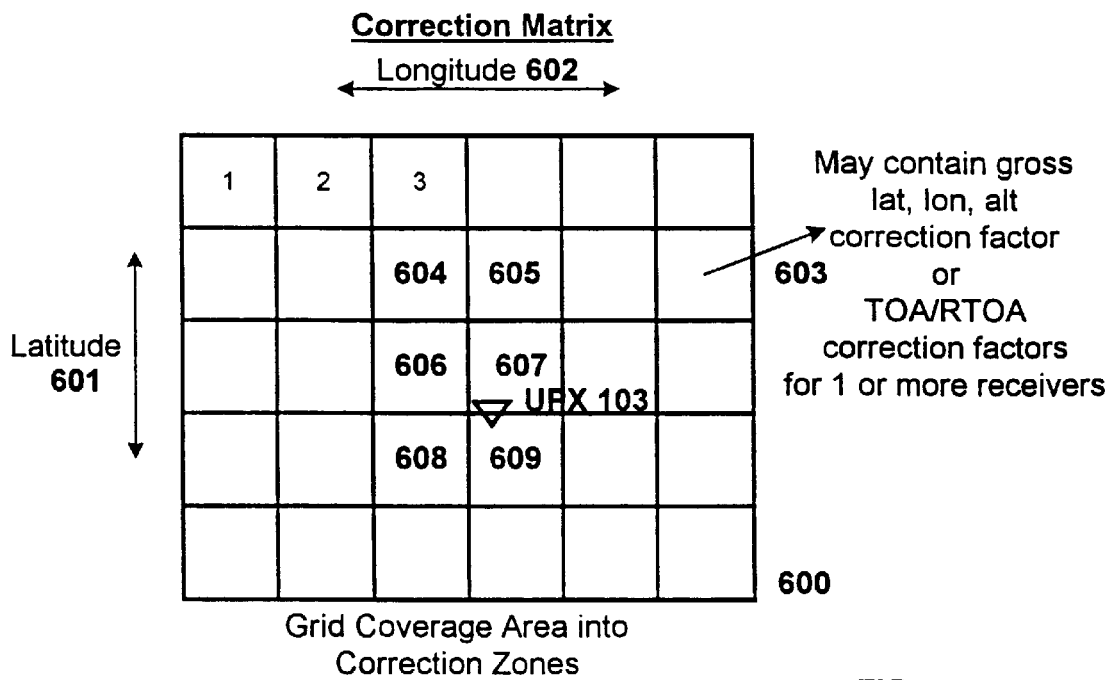
FIG. 6 is a correction matrix containing correction factors for areas having known errors.

FIG. 6 shows a correction factor matrix used to enhance an estimation of the location from which an Unknown Position Transmitter transmitted. As an alternative to the preferred embodiment, conventional methods such as triangulation, multilateration and least squares fit may be enhanced by the use of historic information and training to develop a correction matrix 600. This matrix maps into the latitude 601 and a longitude 602 of the coverage area of interest. The resolution of the grid pattern must be great enough to isolate anomalies due to multi-path reflectors which tend to cause repeatable errors. Each storage node of the correction matrix may contain gross latitude, longitude and altitude correction factors or may contain finer correction factors to Time-of-Arrival/Relative Time-of-Arrival readings from one or more receivers prone to repeatable half errors due to fixed obstructions.

When a UPX 103 first emits a beacon signal, a conventional method produces an initial uncorrected position fix. This initial position fix is used to perform a table look-up from the correction matrix. The correction factor or correction factors are then applied to the previous Time-of-Arrival/ Relative Time-of-Arrival prior to recomputation. In the alternative, the correction factor may contain gross corrections of latitude, longitude and altitude which can then be directly applied to the first position fix calculation.

In a situation where a UPX is not located directly in the center of a particular matrix square, interpolation means may be applied in order to further enhance the accuracy of the correction. In addition, a system of simultaneous equations or differential equations may be employed. In this example information from grid squares 604 through 609 would be used as inputs to simultaneous equations or differential equations in order to best provide a corrected position fix.

Figure 7:
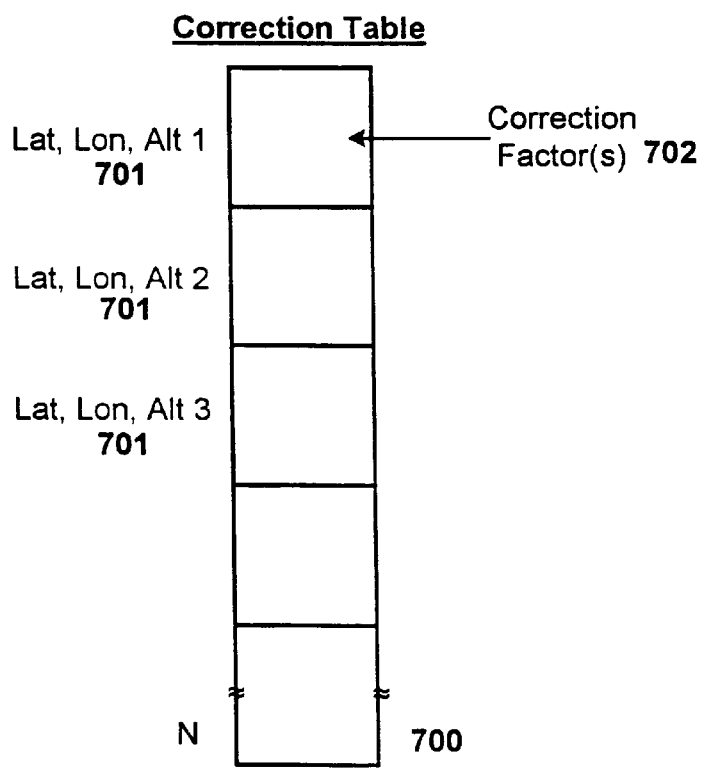
FIG. 7 is a table of correction factors, indexed by latitude, longitude and altitude, of positions having known errors.

As a further alternative, localized areas within the overall coverage area may be identified as being prone to repeatable errors. These localized areas may be stored in a correction table 700, as is shown in FIG. 7. Upon an initial position fix table entries representative of latitude, longitude and altitudes 701 may be searched to determine if the present position fix is near one of the previously stored entries. If a match or close match is found the table entry can be read. The table entry may contain the same type of gross or fine correction factors as were described in FIG. 6. The overall correction procedure would also be the same as noted in FIG. 6. If a correction table is used and a reading falls between two table entries, then linear interpolation or any equivalent means may be used to provide a best fit between two sets of correction factors.

By applying the above correction table techniques, corrections would only be made by exception. If no table entry was found in the proximity of an initial position fix, then that initial position fix would be provided in an uncorrected form.

Figure 8:
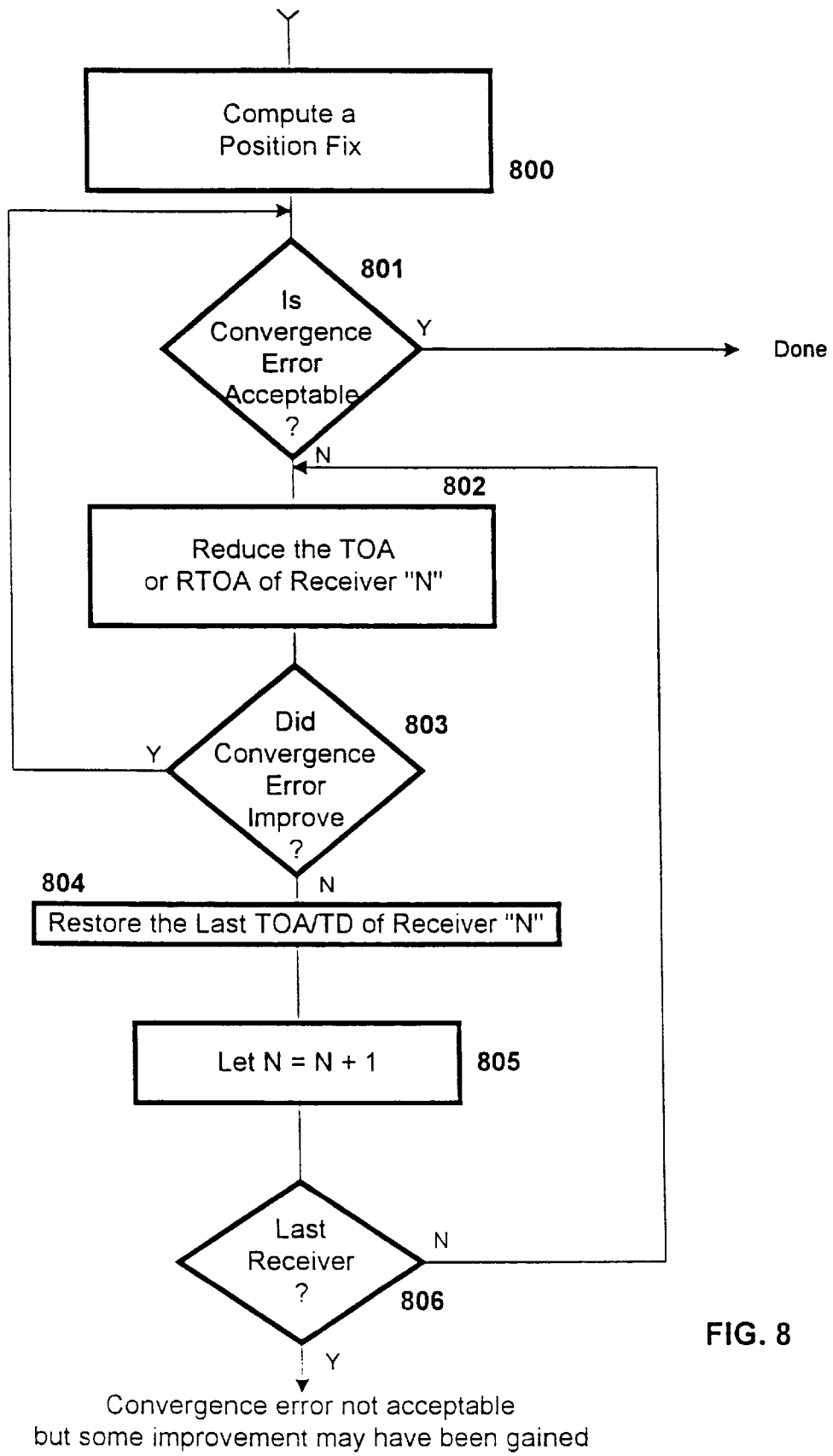
FIG. 8 is a flow chart illustrating a method for enhancing a position fix by reducing reference times of arrivals that reduce convergence error.

Rule based methods may also be employed to try to further reduce errors caused by multi-path delays. The central processing unit may take advantage of the fact that multi-path errors can only result in additional delay to a Time-of-Arrival or Relative Time-of-Arrival reading. FIG. 8 is a flowchart which illustrates a method of reducing the effects of multi-path error without using tables or matrices. The method takes advantage of the fact that a multi-path delay may only effect a single receiver. When a receiver's Relative Time-of-Arrival is used to compute a time difference, then every time difference will have a consistent multi-path error from a particular receiver. The following algorithm takes advantage of these two rules and may be applied independently or in conjunction with the three previously noted processing techniques in FIGS. 5, 6 and 7.

First, a computation is made of a position fix 800 if the convergence error 801 is acceptable, then the error reduction algorithm is not invoked. If the convergence error is unacceptable, then the algorithm proceeds to Step 802. Step 802 incrementally reduces the Time-of-Arrival or Relative Time-of-Arrival of receiver "N". The position fix is then recomputed. Block 803 determines if the convergence error improved over the previous position fix. If it did, control is looped back to Step 801, if it did not, control is passed to Step 804. Since the convergence error did not improve, the last Time-of-Arrival or Relative Time-of-Arrival of receiver "N" is restored because it yielded a better position fix. The next step 805 selects the next available receiver in a particular coverage area. The receivers would likely be limited to those in close proximity to the UPX of interest thereby reducing the number of iterations required in the algorithm. The algorithm uses decision block 806 to loop back to step 802 until all of the receivers have been sought for improvement. If all of the receivers have been tried and no convergence error is acceptable per step 801 then the algorithm may still provide some improvement even though it is not the level of improvement desired. As an alternative, the reading from that receiver may be eliminated from subsequent position computations. As a further alternative, Relative Time-of-Arrival or time difference measurements suspected of large errors may be shunted from the position calculations. This tactic may be used with any of the computation techniques as taught herein.

Figure 9:
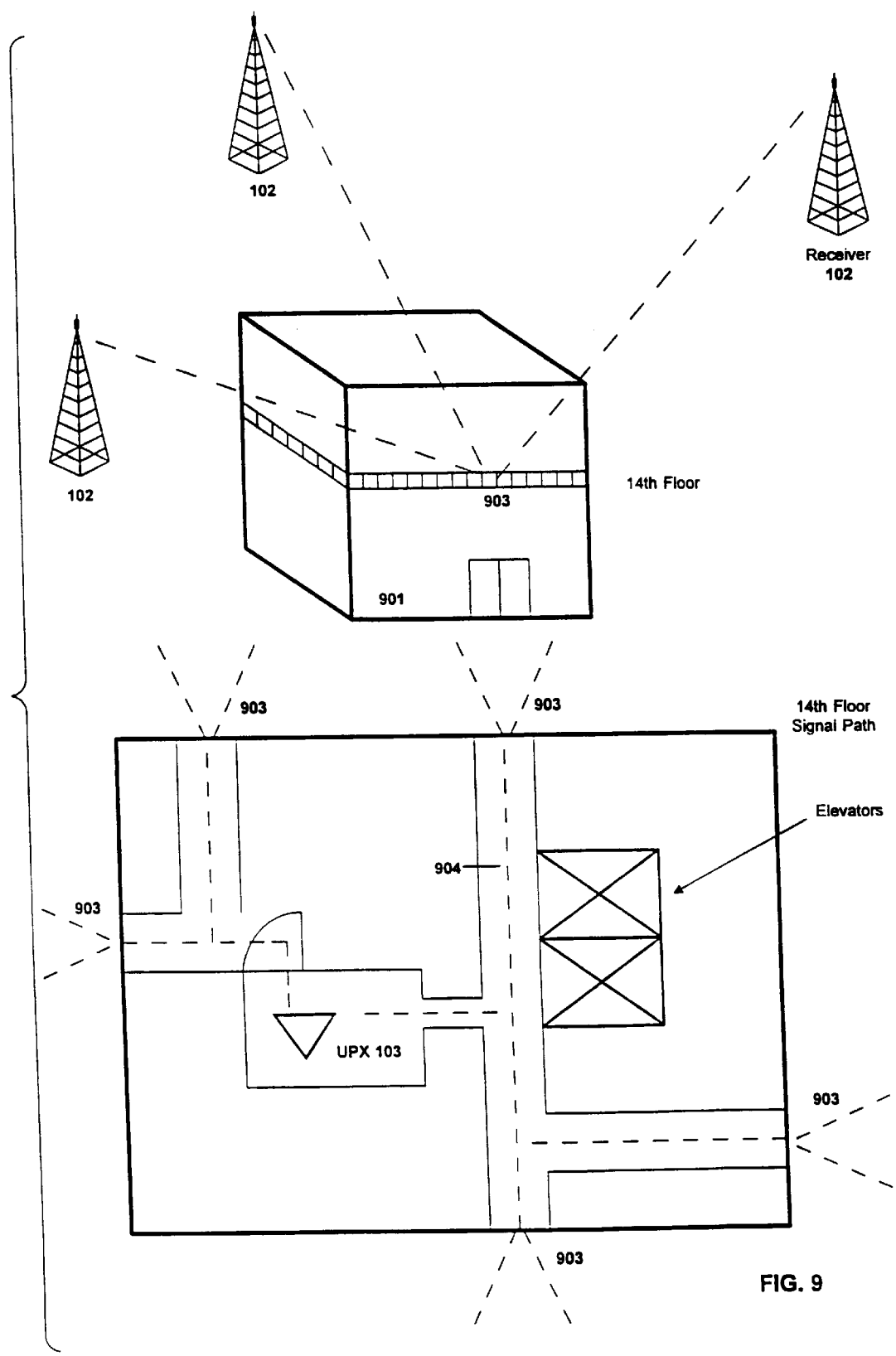
FIG. 9 is a schematic illustration showing how a single UPX in a building can produce multiple apparent point sources to receivers outside of the building.

FIG. 9 shows that additional complexities are encountered when trying to locate a UPX 103 in a multi-story building 901. The walls in construction of a building greatly attenuate the signal path before the transmitted signal reaches a window, door exit or vent. Since the transmitted signal must follow a common path 904, once the signal exits the building, it will appear to be a point source when received by the time of flight system's receivers 102. If the signal is strong enough to exit via more than one window or doorway then multiple point sources will be apparent to the radio location receivers 102. This will force a delay spread profile with leading edge peaks and valleys caused by the constructive and destructive cancellations of the signals leaving multiple exits in the building 901. RAKE receiver techniques as disclosed herein may take advantage of this enriched information in order to better predict the position of a UPX 103 which is located within a single story or multi-story building. As a further alternative, if the user of a UPX frequents a particular building, they would be able to invoke a special training session by calling into the central station operator and forcing the UPX 103 into a burst of training transmissions. The central processing unit would be able to store the resulting signature and use it at a later time to better predict the location of a UPX within that building.

Figure 10:
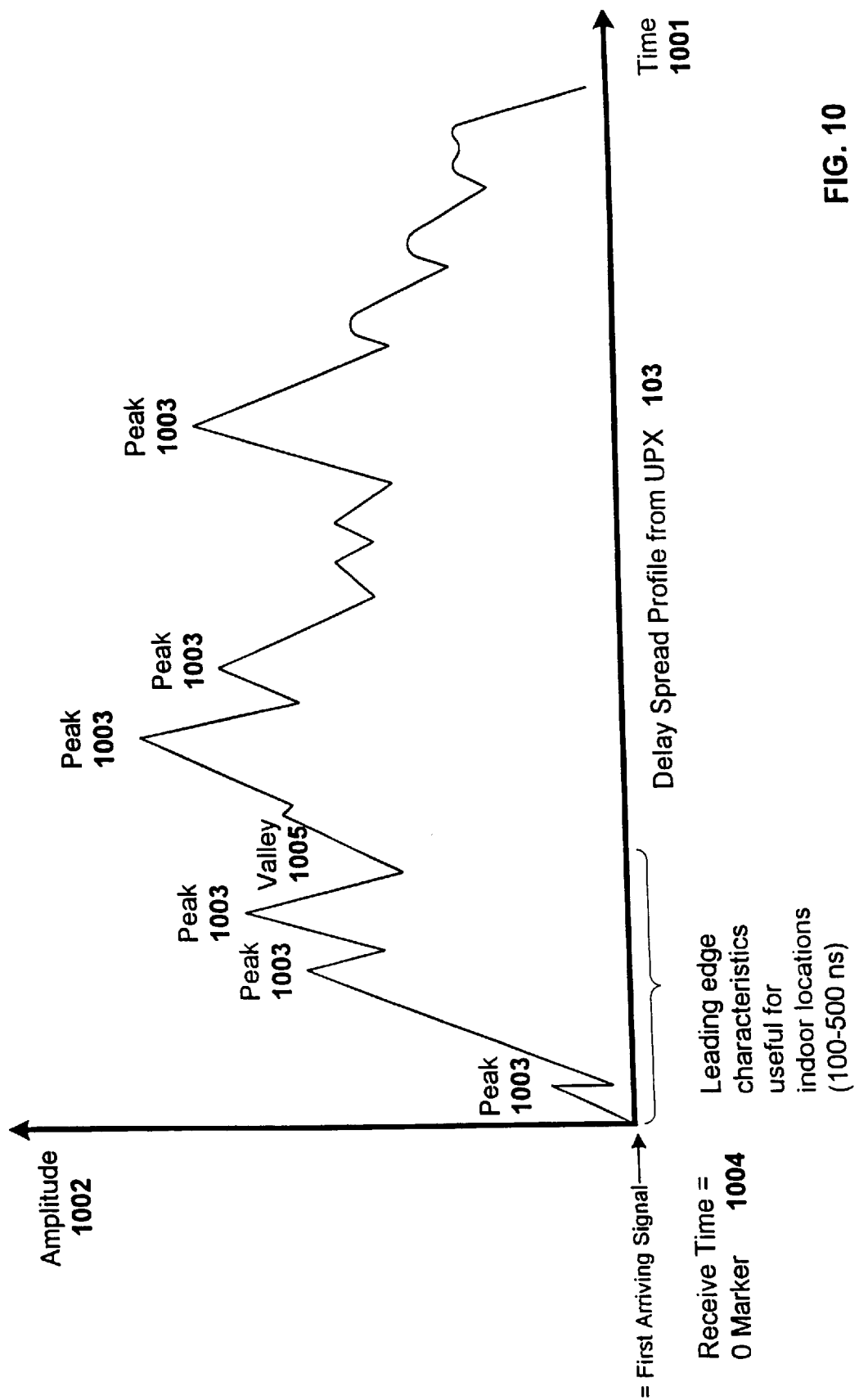
FIG. 10 is a graph of amplitude of an a delay spread profile from a UPX representing arriving signal over time.

Typically, the first arriving information yields the highest degree of accuracy in a time of flight radio position determination system. In some cases, subsequent information may also be useful. One such situation is attempting to locate a transmitter within a building. Several leading edge peaks and valleys may result in the received signal due to different signal propagation paths. This delay spread profile 1000, as depicted in FIG. 10, may provide cues to determine exit points from a building as previously discussed in FIG. 9. In addition to these leading edge cues, the other later arriving peaks and valleys are caused from reflectors which are in the proximity of the UPX. These additional peaks 1003 and valleys 1005 may be utilized to enrich the input to a neural network processing means.

The typical delay spread is indicated by FIG. 10, where the amplitude is shown in 1002 and increasing time increments in 1001. Time equals zero is noted by 1004 and is synthetically set by the first arriving signal which is detected. This profile may be learned by a neural network by invoking a training session for that purpose.

RAKE receiver devices were developed for radio data communications so that signal energy from multiple peaks could be collected and exploited to increase a signal's effective Signal-to-Noise Ratio. This benefit would also be enjoyed by a radio location system which utilized a RAKE type receiver since more transmitted signal energy is being effectively used by the receiver to make a time of flight measurement. Neural networks are particularly well suited to accept information from such a receiver output. The receiver would output information from several peaks and/or valleys which would include amplitude, phase information, as well as distance from Relative Time equals zero.

The peak and valley information associated with the leading edge of a delay spread profile may be further employed to enhance the effectiveness of the use of a mobile reference transmitter. As the Mobile Reference Transmitter grows closer to the UPX, the leading edge signature of the delay spread profile will become more and more similar to that of the UPX. By providing both sets of signature information from the UPX and the MRX simultaneously to the input of a neural network, the network will be able to establish a prediction to at least advise the mobile reference team if they are growing closer to the UPX or further away. The neural network may also be able to provide enhanced accuracy differential position vectors with the added input of the peak and valley information from the leading edge of a delay spread profile.

Figure 11:
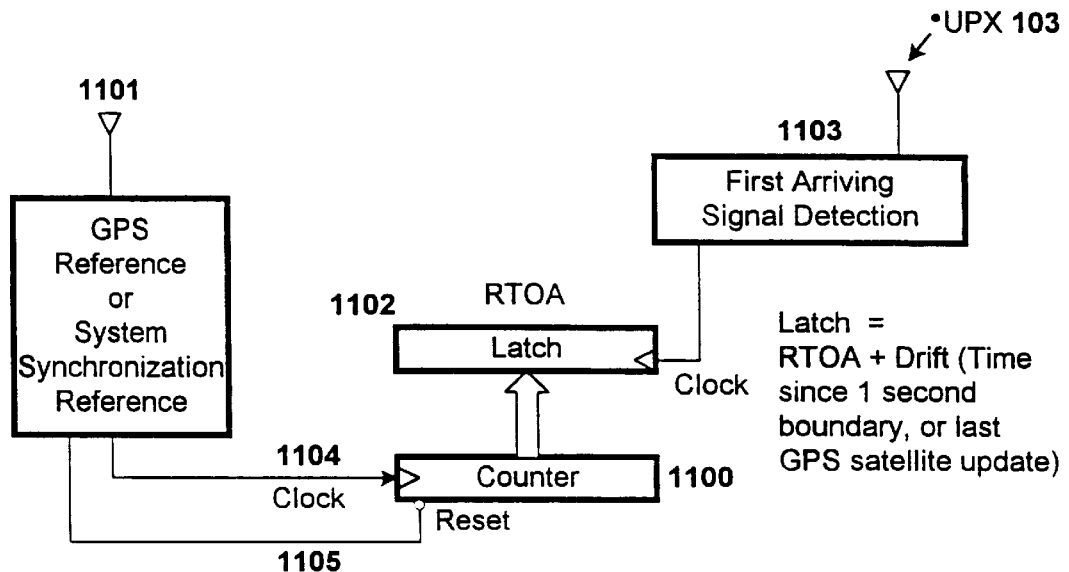
FIG. 11 is a schematic illustration showing a synchronizing receiver using a GPS reference and a counter which is reset on a preset repetitive time interval.

Grid synchronization of the receivers utilized within a desired coverage area must be accurately and reliably provided. Any uncorrected errors due to time base drift will cause systematic errors in position fix accuracy. FIG. 11 depicts a Relative Time-of-Arrival receiver utilizing a GPS receiver as a reference period. GPS satellites are outfitted with highly accurate Cesium atomic clocks as references. That reference information can be derived by a land based GPS receiver. The GPS receiver uses an internal time reference which is recalibrated by GPS satellite transmissions. The time bases free run in between occurrences of GPS satellite lock. Some of these receivers use second order correction techniques to maintain a highly stable internal reference. In addition to this time reference a GPS receiver can be outfitted with a one second tick or a periodic output pulse. This output pulse can be used for system synchronization, whereby the one second tick output of the GPS receiver becomes the reference. In this manner when a UPX signal is detected by a receiver the incoming signal may be measured against the inherent one second time reference, thus providing a Relative Time-of-Arrival measurement. Any inaccuracies caused by the physical location of a GPS receiver may be compensated by means of an initial correction factor or by the use of differential techniques as are well known in the art. As an alternative to a GPS reference 1101, a land based reference may be established providing it is in reasonable view of the various receiving elements in a system and that it provides an accurate and stable time base reference.

FIG. 11 shows a counter 1100 being clocked 1104 by a GPS reference or the like 1101. The GPS reference or the like 1101 also provides a one second or a periodic reset pulse 1105 which is time synchronous to all receivers in a coverage area of interest. When the signal from the UPX 103 is received and detected as a first arriving signal 1103, latch 1102 captures the instantaneous value in the counter 1100.

The latch contents will therefore equal the Relative Time-of-Arrival plus time base drift times the time since the one second boundary or last GPS satellite update has occurred. This approach yields a Time-of-Arrival relative to a GPS reference one second tick output. The Relative Time-of-Arrival can then be used as an input to a trained neural network that corrects for the clock drift between the signal from the UPX 103 and the time reference 1101. The neural network then outputs a timing indicator that has been compensated for clock drift or a drift corrected estimate of a location from which an Unknown Position Transmitter transmitted. The timing indicator is either a modified Relative Time-of-Arrival, a time of arrival or a time difference. When the output is a drift corrected timing indicator, the drift corrected timing indicator can be used as an input to a second network, i.e., a neural network to compute a location from which an Unknown Position Transmitter transmitted that uses Relative Times-of-Arrival as inputs.

Figure 12:
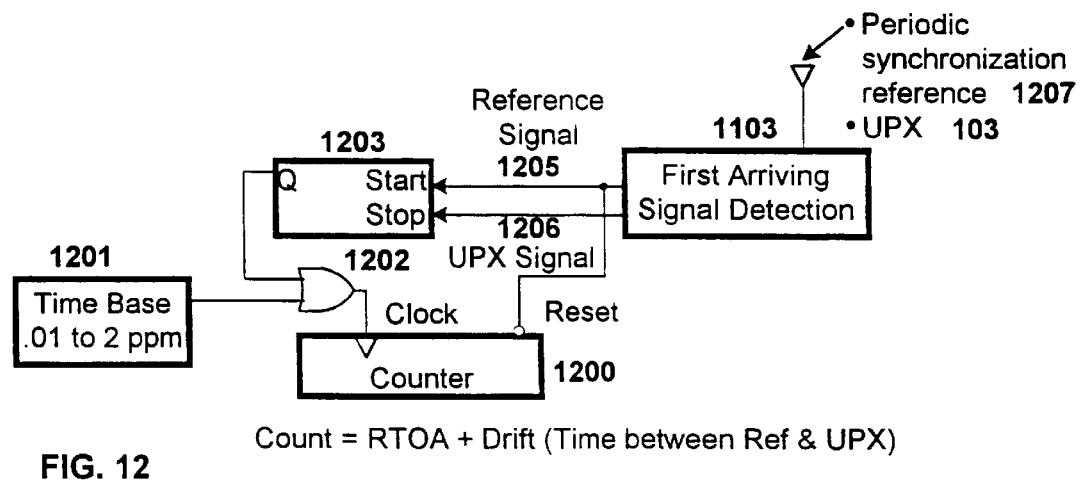
FIG. 12 is a schematic illustration showing a synchronizing receiver using a periodic reference transmission.

FIG. 12 shows a system for correcting for clock drift by using a periodic synchronization reference 1207 rather than directly calibrating a receiver's time base 1201. In this manner, the Time-of-Arrival of a signal from a UPX 103 is relative to the Time-of-Arrival of the periodic synchronization reference 1207. The time base 1201 is gated by gate 1202 as in clock input to a counter 1200. The counter will not count unless gate 1202 is enabled by start/stop 1203. When the periodic synchronization reference 1207 is received as a first arriving signal by receiver 1204, the counter 1200 is reset and the receiver 1204 applies a "start count" pulse via signal line 1205. Upon the reception of a signal from a UPX 103 by the first arriving detection means 1204, the receiver 1204 applies a stop command via signal line 1206. The counter 1200, therefore, counts the number of time base 1201 clock transitions which elapse between the first arriving signal of the periodic synchronization reference 1207 and the first arriving transmission from the UPX 103. This periodic synchronization reference may be generated by a single coverage area wide transmitter or by multiple distributed transmitters which are intended for that purpose. Furthermore, this technique is beneficial in that it allows the use of a less expensive time base compared to the more expensive GPS reference of FIG. 11. It is further possible to equip receiving sites with associated transmitters so that receiving sites may also generate a periodic synchronization reference.

The resulting count in the counter 1200 equals the Relative Time-of-Arrival of the UPX as compared to the periodic synchronization reference plus the time base 1201 drift times the time between receipt of the reference signal 1207 and the signal from the UPX 103. Like the Relative Time-of-Arrival of FIG. 11, this Relative Time-of-Arrival can then be used as an input to a trained neural network that corrects for the clock drift between the signal from the UPX 103 and the time reference 1201. The neural network then outputs either a modified Relative Time-of-Arrival that has been compensated for clock drift or an estimate of a location from which an Unknown Position Transmitter transmitted. As the receiver's clock time base isallowed to be lower cost and less accurate, and as the interval between synchronization reference transmissions lengthens, the value of subsequent second and third order drift corrections by the CPD increases.

Figure 13:
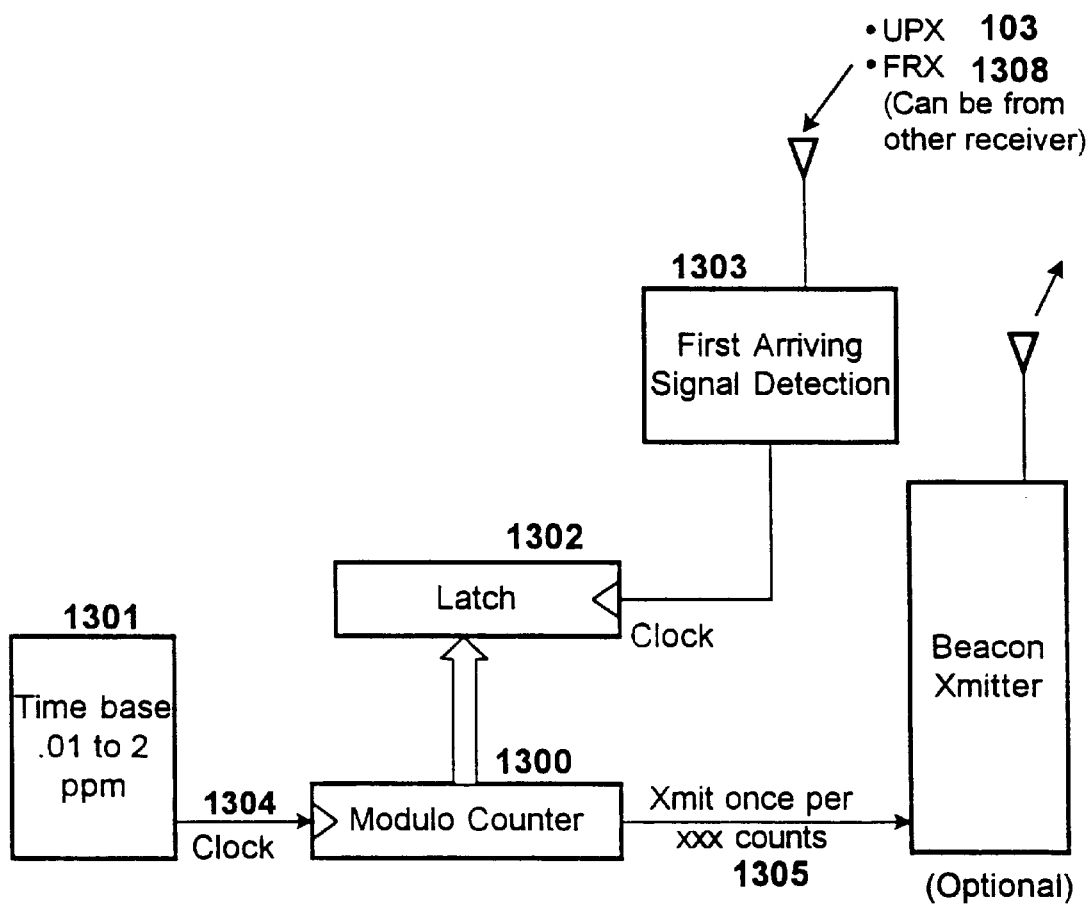
FIG. 13 is a schematic illustration showing a synchronizing receiver using a fixed reference transmitter.

Lastly, FIG. 13 show that it is possible to achieve grid synchronization without the need for rapid periodic synchronization reference transmissions such as noted in 1207. This requires a modulo counter 1300 with additional counting states to hold larger modulo numbers representing greater time gaps between transmissions. It is also necessary to either have a more accurate time base 1301 or higher order time based drift correction at the central processing device. Neural networks are well suited to this drift correction as they are able to take into account high order drift correction factors as well as take into consideration nonlinear effects on a receiver's time base 1301. The timing indicators are used as inputs to a neural network, and the neural network outputs a drift corrected timing indicator. Such drift corrections may alternately be accomplished, and the corrected values used, in any of the position determination processing methods as described herein.

The modulo counter 1300 counts clock pulses 1304 from time base 1301. When either a first arriving signal 1303 is detected from a UPX 103 or from a fixed reference transmitter 1308, a clock pulse is generated to latch 1302. Latch 1302 then stores the instantaneous state of modulo counter 1300. The FRX 1308 may be co-located or made a portion of receivers which are distributed through coverage area of interest.

The latch 1302 now contains a number equal to the Relative Time-of-Arrival (since the modulo counter first started) plus a random number (which was present at the modulo counter's startup) plus a drift factor times the time offset from the last FRX reception.

If a beacon transmitter or a FRX is co-located with a receiver, it may embodied as beacon transmitter 1306. This beacon transmitter may further be initiated once per a predetermined number of counts via control line 1305 as driven from modulo counter 1300. This has the advantage of using the same transmission interval timer as the modulo counter 1300 which is used for Relative Time-of-Arrival information. In this manner the drift error of time base 1301 is common to both received signals and transmitted beacon signals. This information may be used by the central processing unit to further enhance drift error correction. As a further alternative, beacon transmitter 1306 may transmit the content of the modulo counter 1300 upon the receiver detecting a specially coded poll transmission. Beacon transmitter 1306 may further transmit the reception of a transmission from another fixed reference transmitter 1308 which may be colocated with a remote receiver. In this manner, round trip measurement and other synchronizing techniques may be employed. This allows further tactics to eliminate the random number portion which is inherent in the modulo counter.

Several other drift elimination tactics can then be utilized by the central processor device.

FOR THE FRX:

1) If transmission interval is accurate and the drift accordingly small, then $RTOA_2-RTOA_1$=xmit interval (of FRX)

2) $FRX_{xmit\ 1}$ Reading=$RTOA_1$+RND#

3) $FRX_{xmit\ 2}$ Reading=$RTOA_2$+RND #+ Drift of Receiver+xmit interval+Drift of xmit interval ∴$FRX_2-FRX_1$=Drift of Receiver+Drift of xmit interval 4) The drift of a less accurate transmission interval may be further eliminated by using a Time Difference, TD, approach:

$RTOA_{rcv1}=RTOA_{xmit1}$+Drift of $Rcv_1$+Drift of xmit interval $RTOA_{rcv2}=RTOA_{xmit2}$+Drift of $Rcv_2$+Drift of xmit interval $TD=RTOA_{xmit1}-RTOA_{rcv2}$ ∴$TD=RTOA_{xmit1}-RTOA_{xmit2}$+(Drift of $RCV_1$-Drift of $RCV_2$)

The combinational drift factor of RCV1–RCV2 will remain relatively constant over short time durations. This combinational reference transmission drift correction factor may then be applied to the same receiver pair when determining the TD of a UPX.

Further, $RTOA_1=RTOA_2$-xmit interval

RND #=$FRX_{xmit\ 1}$ Reading-$RTOA_1$

This drift factor can be used to correct for resulting position fix errors.

FOR THE UPX:

UPX Reading=RTOA+RND #+(Drift·time since last FRX reception)+time since last FRX reception ∴UPX Reading-RND # (from FRX)-time since last FRX reception-(Drift·time since last FRX reception)= RTOA of UPX A system of simultaneous equations may also be employed to resolve drift and to establish receiver synchronization. Whereby all of the information as noted would be utilized such that the number of equations at least equals the number of unknowns.

Figure 14:
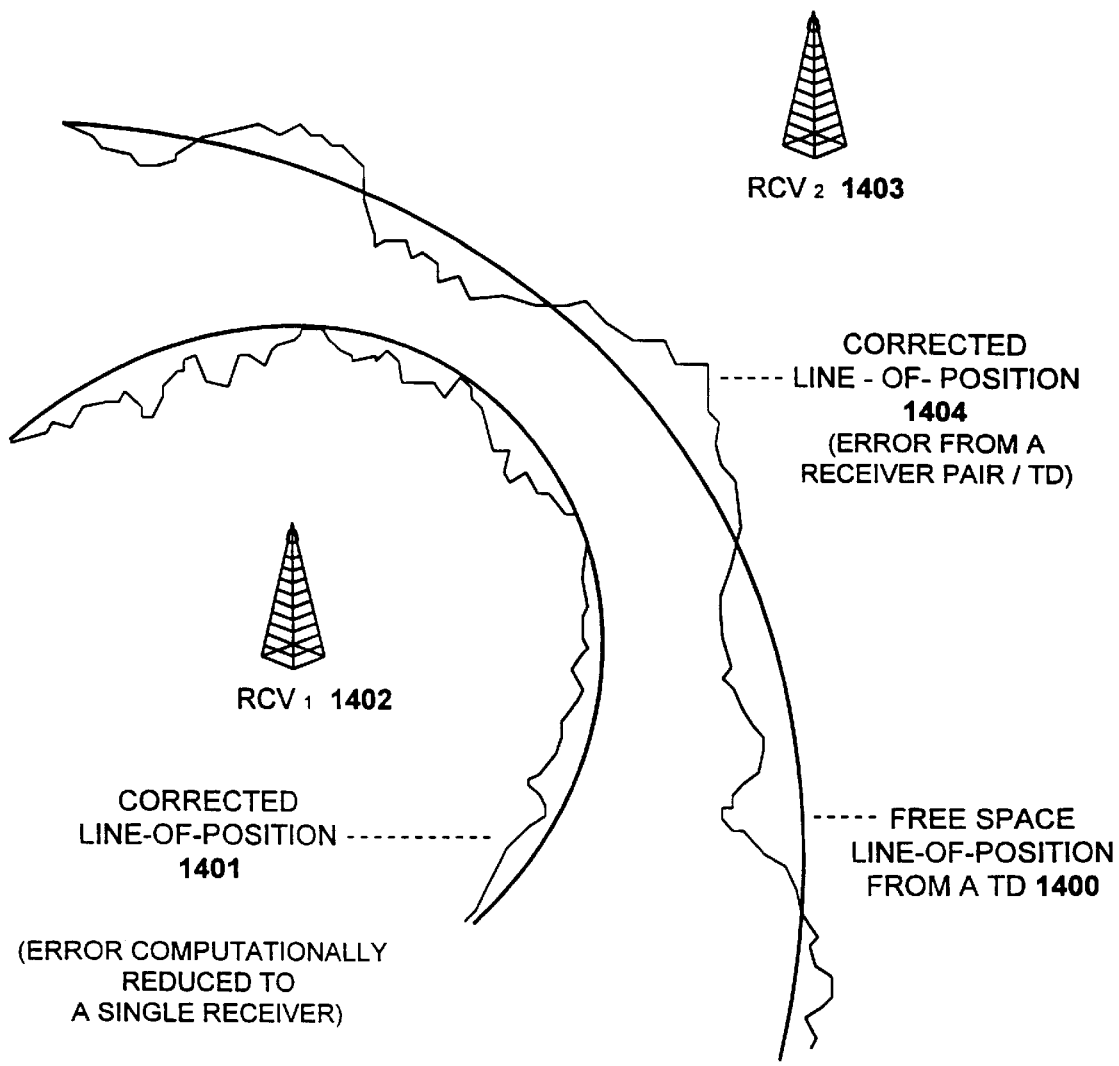
FIG. 14 is a graph showing two hyperbolic lines of position with correction factors between two receivers.

FIG. 14 shows two hyperbolic lines between two receivers corresponding to time difference paths. The time of flight system may provide either a Time-of-Arrival from a transponder or a Relative Time-of-Arrival from a transmit-only UPX. In a Relative Time-of-Arrival system, the Relative Time-of-Arrival reading from receiver 2 1403 can be subtracted from the Relative Time-of-Arrival of receiver 1 1402 to yield a time difference or TD. That TD may actually fall on any point of a curved line which follows a hyperbolic pattern. This curved line is called a hyperbolic line of position. In free space 1400, the line of position forms a perfect hyperbola about receiver 1 1402. In an actual installation subject to multi-path reflections, time difference measurements at any individual point along this hyperbolic curve will be subjected to added path of travel. All of the processor techniques described herein effectively create a corrected line of position 1401 whereby previous actuarial/historic information is used to derive a correction factor which is applied to readings during the normal operation of the system. This further requires that the error term is computationally resolved to a single receiver. If the error term is reduced to a receiver pair, then the correction factor will appear as 1404.

As an alternative to the processor techniques as taught herein, any equivalent lookup table or associative memory means may be employed to read a currently measured TD and use that to establish the corrected line of position 1401. The data from the corrected line of position can then be used by position calculation algorithms as are known in the art.

What is claimed is:

1. A method for determining a location of an unknown position radio transmitter under low signal-to-noise ratio conditions, comprising the steps of:

receiving a first radio signal, including a unit identification, at a first transmission time from an unknown position radio transmitter at a first of n radio receivers, where n>2;

determining, at said first radio receiver or at a central processing device (CPD), a time of a next unknown position radio transmission;

sending the time of the next radio transmission from the first radio receiver to the other n–1 radio receivers or sending the time of the next radio transmission from the CPD to the n radio receivers;

receiving, with a signal enhancing mode, radio signals from said unknown position radio transmitter at the n radio receivers at the time of the next unknown position radio transmission; and determining a location of said unknown position radio transmitter using said enhanced radio signals.

2. The method of claim 1, wherein said step of determining comprises:

determining the location of said unknown position radio transmission using a neural network.

3. The method of claim 1, wherein said step of determining comprises:
  determining the location of said unknown position radio transmission using an associative memory.

4. The method of claim 1, wherein said step of determining comprises:
  determining the time of the next unknown position radio transmission by reading an indication of the time of the next unknown position radio transmission from data contained in the first radio signal.

5. The method of claim 1, wherein said step of determining comprises:
  receiving a second radio signal at a second transmission time at a second one of said n radio receivers; and
  determining the time of the next unknown position radio transmission by using the first and second transmission times.

6. A digital storage medium comprising an executable computer program to perform the method of claim 1.

7. A method, tolerant of fixed obstacles, for determining a location from which an unknown position radio signal is transmitted, comprising the steps of:
  a) transmitting an unknown position radio signal from an unknown location;
  b) receiving said unknown position radio signal at plural radio receivers at different known locations;
  c) determining reference times of reception when said unknown position radio signal is received by plural receivers;
  d) communicating to a central processing device (CPD) said reference times and said unknown position radio signal;
  e) designating a first of said plural radio receivers as a current receiver;
  f) estimating an initial unknown location estimate, having a convergence error, of said unknown location;
  g) ending the estimation process if said convergence error is less than a specified threshold;
  h) reducing the time value corresponding to the current receiver to a smaller time value;
  i) determining a new unknown location estimate, having a new convergence error;
  j) setting the convergence error equal to the new convergence error and repeating steps g–i if the new convergence error is smaller than the previous convergence error;
  k) resetting the smaller time value to the time value of step g if the new convergence error of step i was larger than the convergence error of step g; and
  l) repeating steps g–k for each of said plural radio receivers that have not been designated as the current receiver.

8. A method for determining a location from which an unknown position radio signal is transmitted, comprising the steps of:
  transmitting from plural known mobile locations respective mobile radio signals;
  receiving said mobile radio signals at plural receivers located at different known locations, said mobile radio signals having at least one of leading edge peak and leading edge valley delay spread profile cues;
  determining a reference time of reception when each mobile radio signal transmitted from said mobile known locations is received by the plural receivers which received each respective indoor signal;
  communicating to a central processing device (CPD) information relating to the mobile radio signals received by the plural receivers, including the respective reference times of reception when each of the mobile radio signals were received by the respective plural receivers;
  receiving at plural receivers an unknown position radio signal from an unknown location;
  communicating to the CPD information relating to the unknown position radio signals received by the plural receivers receiving the unknown position radio signal, including the respective reference times of reception of the unknown position radio signal at the respective plural receivers;
  transmitting from subsequent plural known mobile locations respective subsequent mobile radio signals;
  receiving said subsequent mobile radio signals at plural receivers located at different known locations, said subsequent mobile radio signals having at least one of leading edge peak and leading edge valley delay spread profile cues;
  determining a reference time of reception when each subsequent mobile radio signal transmitted from said subsequent mobile known locations is received by the plural receivers which received each respective subsequent mobile radio signal;
  communicating to the CPD information relating to the subsequent mobile radio signals received by the plural receivers receiving the subsequent mobile radio signal, including the respective reference times of reception when each of the subsequent mobile radio signals were received by the plural receivers;
  using the communicated unknown position radio signals in relation to the respective reference times of reception of the unknown position radio signals and the subsequent mobile radio signals in relation to the respective reference times of reception of the subsequent mobile position radio signals as inputs to the CPD; and
  outputting from the CPD an estimate of the actual location from which the unknown position radio signal was transmitted.

9. The method of claim 8, further comprising the steps of:
  training the CPD using the received mobile radio signals and the known locations from which each of the received mobile radio signals were transmitted in relation to the respective reference times of reception at the plural receivers of the received mobile radio signals, wherein the CPD comprises a neural network.

10. A system for determining a location from which an unknown position radio signal is transmitted, comprising:
  means for transmitting from plural known mobile locations respective mobile radio signals;
  means for receiving said mobile radio signals at plural receivers located at different known locations, said mobile radio signals having at least one of leading edge peak and leading edge valley delay spread profile cues;
  means for determining a reference time of reception when each mobile radio signal transmitted from said mobile known locations is received by the plural receivers which received each respective indoor signal;
  means for communicating to a central processing device (CPD) information relating to the mobile radio signals received by the plural receivers, including the respective reference times of reception when each of the mobile radio signals were received by the respective plural receivers;

means for receiving at plural receivers an unknown position radio signal from an unknown location;

means for communicating to the CPD information relating to the unknown position radio signals received by the plural receivers receiving the unknown position radio signal, including the respective reference times of reception of the unknown position radio signal at the respective plural receivers;

means for transmitting from subsequent plural known mobile locations respective subsequent mobile radio signals;

means for receiving said subsequent mobile radio signals at plural receivers located at different known locations, said subsequent mobile radio signals having at least one of leading edge peak and leading edge valley delay spread profile cues;

means for determining a reference time of reception when each subsequent mobile radio signal transmitted from said subsequent mobile known locations is received by the plural receivers which received each respective subsequent mobile radio signal;

means for communicating to the CPD information relating to the subsequent mobile radio signals received by the plural receivers receiving the subsequent mobile radio signal, including the respective reference times of reception when each of the subsequent mobile radio signals were received by the plural receivers;

means for using the communicated unknown position radio signals in relation to the respective reference times of reception of the unknown position radio signals and the subsequent mobile radio signals in relation to the respective reference times of reception of the subsequent mobile position radio signals as inputs to the CPD; and means for outputting from the CPD an estimate of the actual location from which the unknown position radio signal was transmitted.

* * * * *